Sept. 20, 1971   M. R. CALTON ET AL   3,605,253
METHOD OF INERTIAL WELDING TO ELIMINATE CENTER DEFECTS
Filed May 13, 1969   2 Sheets-Sheet 1

INVENTORS
MARION R. CALTON
THEODORE L. OBERLE
CARL D. WEISS
RALPH W. YOCUM
BY
ATTORNEYS

United States Patent Office 3,605,253
Patented Sept. 20, 1971

3,605,253
METHOD OF INERTIAL WELDING TO ELIMINATE CENTER DEFECTS
Marion R. Calton, East Peoria, Theodore L. Oberle, Washington, and Carl D. Weiss and Ralph W. Yocum, Peoria, Ill., assignors to Caterpillar Tractor Co., Peoria, Ill.
Filed May 13, 1969, Ser. No. 824,066
Int. Cl. B23k 27/00
U.S. Cl. 29—470.3     8 Claims

ABSTRACT OF THE DISCLOSURE

Defects at the center of inertial friction welded parts are prevented from forming during the welding process. The frictional heating is initiated near the center of the interface at the beginning of the welding process. The yielding of the parts is confined to a narrow band of material on either side of the interface throughout the weld process. This insures that the central portions of the end surfaces of the parts being welded are maintained in contact throughout the weld process and are adequately heated to produce the plasticity required to form a weld without defects.

BACKGROUND OF THE INVENTION

Field of the invention

Figure 2:
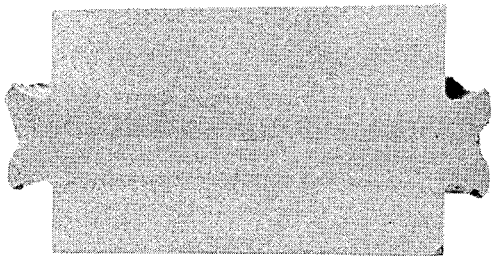

This invention relates to methods of inertial friction welding parts of circular cross-section. This invention relates specifically to methods for eliminating defects in the center portion of the weld zone of parts welded by the inertial friction welding process.

Description of the prior art

Friction welding, as it first developed, involved a relatively long weld cycle. In the conventional friction welding process the long duration of the weld cycle is a result of the way the process is carried out. In the conventional friction welding process the two parts to be welded are driven in relative rotation by an electric motor while the parts are pressed together under an axial load. After a period of time the drive from the electric motor is stopped and the rotation is braked. This sequence takes a substantial amount of time, usually from ten to thirty or more seconds, depending upon the size of the parts and the materials of the parts to be welded. The relatively long period of time during which the parts are driven in relative rotation results in a substantial amount of heat energy being introduced into the weld zone and also usually provides enough time to permit spreading of the heat across the entire interface.

In the inertial friction welding process the energy for welding parts is taken from that stored in a rotating flywheel connected to drive one of the parts. The weld energy is taken from the flywheel much more rapidly than the energy is supplied from the motor in the conventional friction welding process. The weld cycle is therefore much shorter in the inertial friction welding process. The quickness of the inertial welding process has presented problems in obtaining adequate heating and contact of the central portion of the circular shaped interface weld area. Because of the rotary nature of the process, the very center of pieces joined by conventional friction welding or by inertial friction welding experiences no relative motion. The center is, therefore, not heated by friction. Also, the area very near the center experiences very little relative motion and is only partially heated by friction. In inertial friction welding the problem is more severe than in conventional friction welding because of the shorter heating time in inertial welding. Thus, in the prior art, the center and the area very close to the center of inertial friction welded bars were heated only by conduction and diffusion. Because the inertial welding process is a fast process, the prior art inertial friction welding process has presented the problem of insufficient heating at the center of the interface area, and voids or defects have resulted from such insufficient heating. The problem has been particularly prevalent in welds of large diameter bars and in welds of materials having relatively low yield strength.

SUMMARY OF THE INVENTION

The method of the present invention initiates the heating near the center of the interface at the beginning of inertial friction welding process. The method of the present invention also confines the yielding of the parts to a narrow band of material on either side of the interface all during the weld process. The present invention insures that the central portions of the end surfaces of the part being welded are maintained in contact throughout the weld process to prevent the development of a void at this part of the interface. The method of the present invention also insures that the central portion of the interface is adequately heated to produce the plasticity required to form a weld without a defect.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles.

Other embodiments of the invention embodying the same or equivalent principles may be used and structural changes may be made as desired by those skilled in the art without departing from the present invention and the purview of the appended claims.

Figure 3:
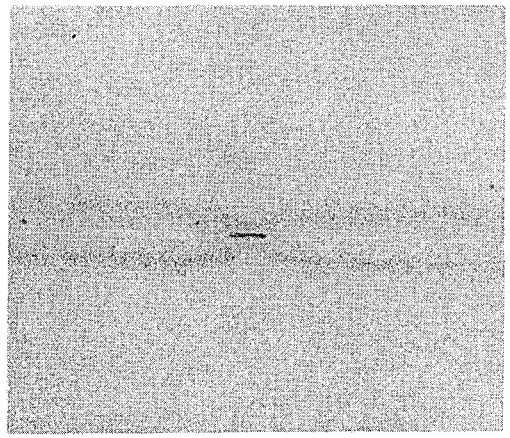
Figure 4:
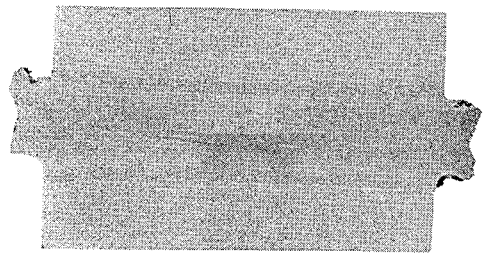
Figure 5:
Figure 1:
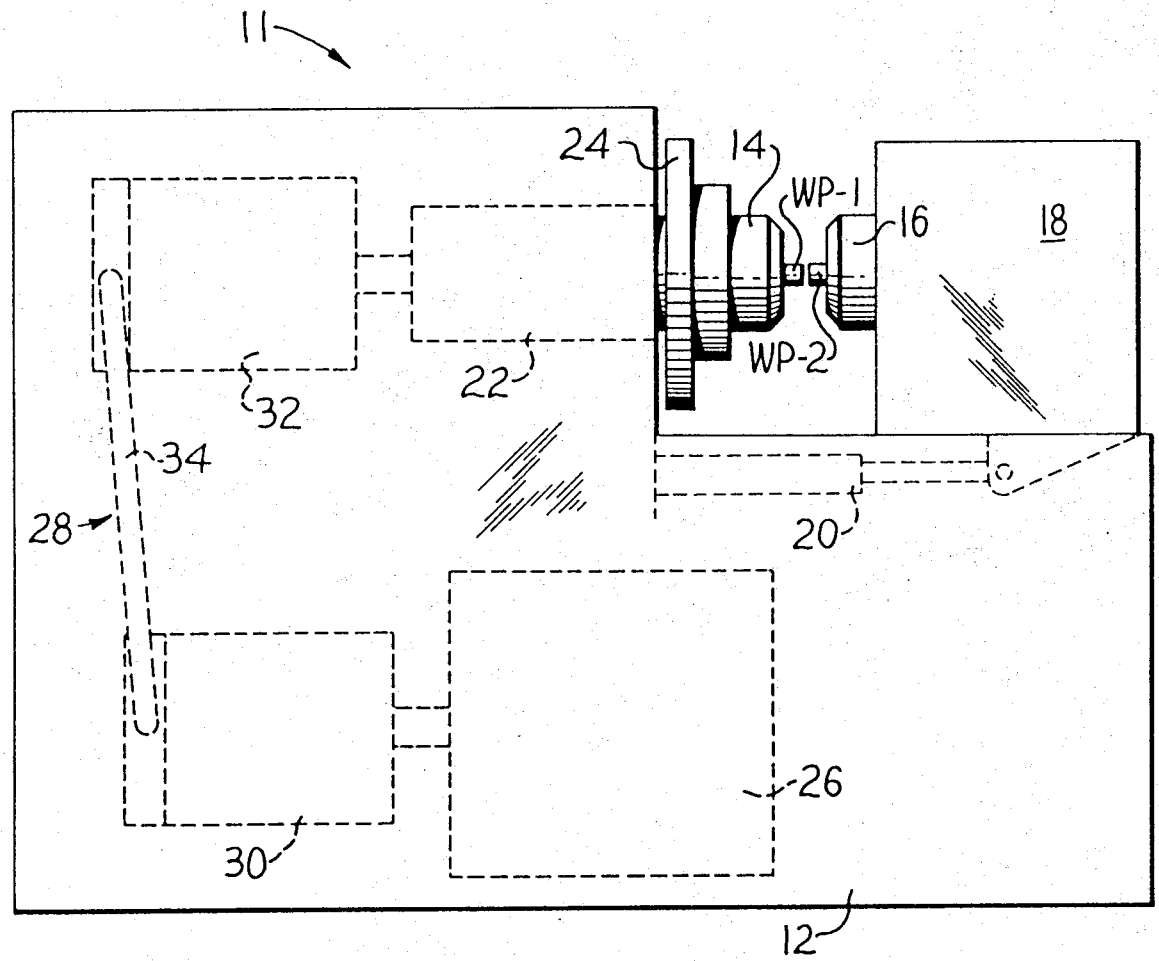

In the drawings:
FIG. 1 is a schematic side elevation view of an inertial friction welding machine;
FIG. 2 is a photograph of an etched cross-section through two welded parts showing a center defect in the welded parts;
FIG. 3 is an enlarged view of the center part of FIG. 2;
FIG. 4 is a view like FIG. 2 showing parts welded without a center defect; and
FIG. 5 is an enlarged view of the center part of FIG. 4.

One form of an inertial friction welding machine constructed to perform the present invention is indicated generally by the reference numeral 11 in FIG. 1. As noted below other forms of inertial friction welders may be used to perform the inertial friction welding process, and the construction and operation of machine 11 is described only to illustrate the process.

The machine 11 comprises a frame or housing structure 12 for supporting the various elements of the machine.

The two parts to be welded, workpieces WP–1 and WP–2, are mounted within chucks 14 and 16.

The chuck 16 does not rotate and is mounted on a tailstock fixture 18. The fixture 18 is mounted for axial movement on the machine frame 12 under the control of a load cylinder 20. A pressure control circuit, not shown, regulates the pressure in the load cylinder, and thus determines the force with which the parts WP–1 and WP–2 are engaged.

The chuck 14 is mounted on a spindle 22, and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission generally indicated by the reference numeral 28. The hydrostatic transmission includes a hydraulic pump 30, a hydraulic motor 32 and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam and the pump 30 to a position in which the pump 30 does not displace any hydraulic fluid to the motor 32.

It is to be understood that the flywheel weights 24 are mounted on the spindle 22 so that the welding machine 11 can be operated as an inertial welding machine as described in U. S. Pat. No. 3,273,233.

A welding operation to join a first workpiece, such as a relatively low strength low carbon steel, to a second workpiece of the same or different composition can be performed by operating the machine in the following general manner. One of the weld pieces WP–1 is clamped in the rotatable chuck 14 located on the spindle 22. The other weld piece WP–2 is clamped in the non-rotatable chuck 16 which is located on the tailstock portion 18 of the machine. Upon actuation of the motor 26, the flywheel and workpiece WP–1 are accelerated to a predetermined velocity.

Once the predetermined velocity has been obtained, the motor 26 is disconnected or shut down and the ram mechanism 20 is actuated to move tailstock portion 18 and workpiece WP–2 into contact with the rapidly rotating workpiece WP–1. As the two workpieces are brought into contact under the upsetting pressure applied through ram 20, heat is generated at the contacting surface or interface of the weld pieces. This heating increases until the workpieces reach the weld temperature, at which time the upsetting pressure, applied by the ram 20 at either a constant or varying pressure, causes flashing or upsetting to occur. During this heating and flashing, the rotational velocity of the spindle member 22 has continued to decrease. At the time the rotation of the spindle ceases, upsetting has taken place and the weld is completed.

The machine 11 described above represents only one form of an inertial friction welding machine. The inertial friction welding process can be performed by other machine configurations. However, regardless of the specific form of the machine, the energy for welding the parts in the inertial friction welding process is always taken from that energy stored in a rotating flywheel connected to drive one of the parts. And the weld energy is taken from the flywheel much more rapidly than the energy is supplied from a drive motor in the conventional friction welding process.

Because the inertial friction welding process is such a quick process, the inertial friction welding process has presented problems in obtaining adequate heating and contact of the central portion of the circular shaped interface weld area. Inadequate heating and contact of the center of the interface results in defective welds in this part of the interface.

As shown in FIGS. 2 and 3 the center defect may be in the form of a void resulting from lack of contact or from oxide remnants of the out of contact surfaces of the parts being welded.

In accordance with the present invention this problem has been analyzed as resulting from two factors. This problem of center defects can result from not starting the heating near enough to the center in the inertial friction welding process. This problem of center defects can also result from a failure to confine the heating closely enough to the interface to spread the heating across the center within the time available in the inertial friction welding process.

In the present invention the problem of center defects has been solved by adopting methods of inertial welding which initiate the heating near the center of the interface and which confine the yielding of the parts being welded to a narrow band of material on either side of the interface. This confinement forces the weld input energy to produce plasticity at the interface rather than to work material a subtsantial distance back from the interface. Techniques for increasing the time the parts are engaged in relative rotation have also been found useful to help eliminate center defects.

In this last regard, many center defects can be effectively eliminated by increasing the amount of energy. However, more energy (in the amounts required to accomplish the desired result) means much longer cycle time (less productivity) and a greater amount of flash which may have to be removed.

The problem of center defects is a quite significant problem. The center defect acts as a stress raiser. Center defects increase stress concentrations in ways that are somewhat similar to the ways that a notch increases stress concentrations in an outside surface. The center defects can substantially lower the strength of the welded part. The center defects are most critical when the welded part is subjected to axial tension (fatigue especially).

The center defects have occurred most often in low carbon, unhardened steels of relatively low yield strength. However center defects have also been observed in other materials.

Center defects are a problem in large diameter bars, but center defects can also occur in bars as small as ⅜ inch diameter.

It has been theorized that the problem of center defects may be caused by the formation of a stable torus of hot material, located generally at the mid-radius of the parts. The mid-radius torus of hot material may thermally expand to an extent such that the center and the outside edge of one part tend to be lifted, for at least a short time, out of contact with the corresponding surface of the other part. Following this theory, it is considered that this torus must be prevented from forming in a stabilized condition or else the center of the parts being welded will not be adequately heated to produce the necessary plasticity at the center of the interface.

Breakdown of the torus (and resultant spreading of the plasticity to the center) has also been analyzed in terms of adiabatic shear and lower critical velocity. Under this concept you must exceed some lower critical velocity, $V_C$, in order to produce adiabatic shear resulting in a torus which will progress to the center. The adiabatic shear is related to $(K, R, C)^{0.5}T_M$, where K is thermal conductivity, R is density, C is heat capacity, and $T_M$ is the melting point of the material being welded. Then the velocity required to prevent center defects (allowing the torous of adiabatic shear to progress toward the center) is related to $(KRC)^{0.5}T_M$. For example, $$V_C = (2 \text{ to } 4)(KRC)^{0.5}T_M$$

for most materials.

There are several techniques which initiate or tend to initiate the heating near the center of the interface. These techniques will be described separately in greater detail below; but at this time it may be noted that the techniques include higher initial speeds, center projections, low welding load, a slow rate of load build-up, and a controlled two step load cycle.

As will also be described in greater detail below there are a number of techniques for concentrating and confining the input of weld heat to a narrow band of material on either side of the interface. These techniques in most cases produce lower initial torque levels so that there is less tendency to work material a substantail distance back from the interface. These techniques for confining the working more tightly to the interface also have the effect of overcoming a stable torus by causing it to propagate toward the center, and outward too. These techniques include lower loads, slow rate of load build up, pre-weld treatment of one or both parts (such as hardening an end of one part), using different material for one or both parts, using a different diameter for one part, lowering the load-to-energy ratio, using a step loading cycle with a lower initial load, cooling of one part, and use of a restraint sleeve.

Lower loads and slow rate of load build-up extend the cycle time, allowing more time for conducting heat and plastic material into the center region.

As will also be described in greater detail below, the time at heat (duration of relative rotation) can be increased by storing extra energy in the flywheel.

A center projection has been found highly effective to eliminate center defects by initiating the heating at the center of the interface. The maximum size of the projection can be critical. When you exceed one-half to three-quarters of the overall diameter of the bar, the projection can work against you. Center projections of this size or larger can themselves produce center defects plus laps at the edge of the projection. There is perhaps an optimum size projectiin for a given diameter of bar.

The projection can be formed by machining the projection directly onto the end of one piece. The projection can be arc welded at a small spot or tip on the end of one piece. A small separate projection can be attached to the end of one weld piece by glue, magnetic force or other means. The projection generally needs to be only several thousandths of an inch thick and has to be provided on only one of the two weld pieces.

The center projection also tends to limit the initial torque peak. A center projection will also overcome other factors, such as too low an initial speed or improper axial load.

From a parameter standpoint, the singlemost important variable (so far as eliminating center defects is concerned) appears to be the initial speed. High initial velocity will generally initiate heating near the center of the interface. The high initial speeds have the effect of locating the initial contact annulus very close to the center of the interface.

Speeds in excess of 1900 feet per minute at the surface of SAE 1018, 1045 and 1095 steel bars appear adequate to eliminate center defects in inertial welds of these materials regardless of the load level used in performing the weld.

In some cases a very small increase in speed makes the difference between a good weld and a poor weld.

Finding the optimum speed might be quite difficult for bars of certain sizes or materials. And, in some cases, after the speed is determined, machine limitations or other factors may prevent such a speed being used. An increase in velocity also generally necessitates an increase in energy. Such an increase in energy may be undesirable in certain circumstances. In such cases other means must be employed to promote center heating.

Lower initial axial load will tend to initiate the heating near to the center of the interface. The lower pressure also produces lower initial torque levels in the inertial welding process. This in turn reduces the yielding of the material back from the interface so that the heating is concentrated and in effect is confined at the interface. As noted generally above, lower loads (and the other factors noted) have a disruptive influence on a stable torus and thus cause propagation toward the center. In addition, also as noted above, low loads increase heating time, and therefore give the torus (and heat) more time to progress and conduct.

The proper axial load will sometimes lie in a rather narrow band. A load that is too low may produce center defects, and a load that is too high may also produce center defects.

FIGS. 2–5 illustrate the effect of reducing the load in eliminating center defects. The parts being welded were one inch diameter round bars of SAE 1018 steel. The welds were made at 3,800 r.p.m. and 18.76 $WK^2$ (lb.-ft.$^2$). The energy was 46,000 foot pounds, and the material constant C (as will be described in greater detail with reference to an empirical formula to be set out below) was 1450. The only difference between the weld shown in FIG. 2 and the weld shown in FIG. 4 was a difference in the axial load. In FIG. 2 the axial load was 11,000 pounds. In FIG. 4 the axial load was 8,000 pounds. The weld shown in FIG. 2 has a center defect in the form of a void (as best shown in the five time enlargement of FIG. 3). The weld shown in FIG. 4 has no center defect.

Another method to improve center heating of inertial welded members is to use a slow rate of load build up. The slower rate of load build up tends to produce lower initial torque levels, and this in turn, as noted generally above, tends to confine the heating at the interface by reducing the yielding of material back away from the interface. This yielding of material some distance back from the interface is a significant factor in relatively low strength materials since such yielding absorbs energy that would otherwise be expended at the interface—energy that would otherwise tend to produce the required plasticity at the interface.

A related technique for eliminating center defects is to use a step form of load application. With this method, the total welding load is divided into two parts, an initial low load and a final high load. The data developed in this area indicate that the first step should be 25% or less of the final load. The same data indicate that the first load should be left on the weld pieces for as long as 50% to 100% of the total weld time, that is, the time during which the parts are engaged in relative rotation. The first step load acts as a heating load with initial heating beginning near the center and then generating outward. The second step load acts as a forging pressure to expel flash and to complete the weld. Since the low load first step does initiate heating near the center of the weld pieces before moving the heating toward the outside, it is necessary to use a relatively long first step time.

Step pressure in some cases permits welding at much lower energies and maximum loads than would be required for a single load weld. This can be quite important when welding very large diameter parts. Lowering the load-to-energy ratio can also have the effect of initiating the heating near the center and confining the heating to the immediate interface area. A lower load-to-energy ratio lowers the stressing back from the interface.

With steel bars having carbon contents in the range of 0.08% to 0.45% it has been found that load energy ratios in the range of 0.25 to 0.50 are desirable to avoid the formation of center defects.

As noted above, if a relatively soft part is worked at some distance back from the interface, too much of the stored energy may be dissipated away from the interface with the result that the interface itself is not heated in the center part to the required state of plasticity.

There are a number of techniques that can be used to produce a physical restraint against such excess yielding back away from the interface.

In some cases a soft part may be treated prior to welding to harden at least the end surface portion of that part. The occurrence of center defects with steels having carbon contents in a range .08% to .30% can be significantly reduced if the end surface is hardened from Rockwell C. 30 to Rockwell C 50 prior to welding.

In some cases an alternative technique of reducing the strength of one part can be used. This can be done by heating to 300° F. to 800° F. and annealing. In proper circumstances such heating of one part can produce a difference between the strengths of the two parts being welded and can cause flashing at different rates to eliminate center defects.

A soft part can be cooled during the welding process, as by circulation of a liquid in a jacket around the part, to reduce the loss of strength in the material behind the interface which would normally occur because of the heat generated in the welding process.

A restraint sleeve can be placed about a soft part closely adjacent to the interface to prevent bulging, (axial movement) of material back from the interface. A larger diameter for a soft part can be used to cause the excess diameter to act as a ring or collar restraint similar to a separate restraint sleeve.

Using different materials for one or both of the parts being welded has, in some cases, also been found helpful to prevent the formation of center defects. Substituting a different material for one part can cause the two parts to flash at different rates. This in turn can disrupt the continuity of a stabilized condition at the interface during the weld cycle and can tend to spread the heating across the entire interface.

Several different equations have been used to determine parameters for inertial welding. The energy required to weld round bars can be calculated by the empirical relationship $E = CD^{2.5}V^{0.5}$ where: C equals a material constant; D equals the bar diameter in inches; and V equals the surface velocity in feet per minute.

The appropriate flywheel inertia mass can be determined from the formula $WK^2 = 5873E/N^2$ where: $WK^2$ equals the inertial mass of the flywheel in lb.-ft.$^2$; and N equals the speed of revolutions per minute. This formula approach for determining the energy will produce sound welds without center defects in steels having carbon contents in the range of 0.08 to 0.45% where the constant C is within the range 1000 to 1600, the load-to-energy ratio is in the range of 0.25 to 0.50 and the surface velocity V is in the range 1000 to 2000 ft./min.

Step loads in the range $L/E = .25$ to .50, when used in combination with the speeds and energies set forth above for the materials set forth above, have also been found effective to produce inertial welds without center defects.

The load with which the parts are initially engaged can also be determined in accordance with the empirical relationship $L = KD^{2.5}V^{0.5}$ where: K equals a material constant; D equals the bar diameter in inches; and V equals the surface velocity in feet per minute. This relationship for determining the load is basically the same as that for calculating the energy as set forth above. However, the material constant K is a different numerical amount than the material constant C.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A method of inertial friction welding end surfaces of two metal parts across an interface of circular cross-section to eliminate defects in the center of the welded interface and comprising, storing all of the energy needed to produce the weld in a flywheel connected to one part, forming an axially extending center projection of relatively small diameter and relatively thin axial thickness at the center of the end surface of one of the parts prior to pressing the parts together, pressing the end surfaces of the parts together in rotating contact a the interface to heat the interface rapidly to a plastic weldable condition by taking stored energy from the flywheel at the interface friction and plastic working slow the rotation of the flywheel, initiating the heating near the center of the interface by first engaging the center projection with the other part during the rotating contact to produce a plastic condition at the center of the interface and then rapidly spreading the plastic working to the periphery of the interface as the flywheel is quickly decelerated to a stop, and confining the yielding of the parts to a narrow band of material on either side of the interface to force the weld input energy to produce the plasticity at the interface rather than to work material a substantial distance back from the interface.

2. A method as defined in claim 1 including varying the speed of relative rotation after the parts are engaged to spread the heating over the interface.

3. A method as defined in claim 1 wherein the parts are steel bars having a yield strength less than 100,000 pounds per square inch, the bars are initially engaged in relative rotation at a surface speed in excess of 1000 feet per minute, the bars are initially engaged with an axial load that produces the average pressure of less than 10,000 pounds per square inch over the area of interface and the axial load is increased during the weld cycle to produce an average pressure greater than 15,000 pounds per square inch over the area of the interface at the ending of the relative rotation of the bars.

4. A method as defined in claim 1 including engaging the parts with an initial surface velocity in the range of from approximately $(2 \text{ to } 4)(KRC)^{0.5}T_M$ where K is the thermal conductivity, R is the density, C is the heat capacity and $T_M$ is the melting point of the material being welded.

5. A method as defined in claim 1 including welding steel bars having carbon contents in the range of 0.08% to 0.45% with load-energy ratios in the range of 0.25 to 0.50.

6. A method as defined in claim 1 including using an energy input equal to $CD^{2.5}V^{0.5}$ where: C equals a material constant; D equals the bar diameter in inches; and V equals the surface velocity in feet per minute.

7. A method as defined in claim 6 including using a flywheel mass determined from the relationship $$WK^2 = 5873E/N^2$$

where: $WK^2$ equals the inertial mass of the flywheel in lb.-ft.$^2$; N equals the speed in revolutions per minute; and E equals the energy determined in accordance with claim 6.

8. A method as defined in claim 1 including using an axial load in accordance with the relationship $$L = KD^{2.5}V^{0.5}$$

where: K equals a material constant; D equals the bar diameter inches; and V equals the surface velocity in feet per minute.

References Cited

UNITED STATES PATENTS

| | | | |
|---|---|---|---|
| 3,134,169 | 5/1964 | Hollander et al. | 29—470.3 |
| 3,234,646 | 2/1966 | Hollander et al. | 29—470.3 |
| 3,235,162 | 2/1966 | Hollander | 29—470.3 |
| 3,435,510 | 4/1969 | Oberle et al. | 29—470.3 |
| 3,468,732 | 9/1969 | Hewitt | 156—73 |
| 3,477,117 | 11/1969 | Calton et al. | 29—470.3 |
| 3,478,411 | 11/1969 | Goloff et al. | 29—470.3 |

OTHER REFERENCES

Vill, V. I., Friction Welding of Metals, 1962, pp. 23–28, 35–38, 58–59.

JOHN F. CAMPBELL, Primary Examiner

R. J. CRAIG, Assistant Examiner

U.S. Cl. X.R.

156—73; 228—2